United States Patent [19]

Gyllstrom et al.

[11] Patent Number: 5,179,708

[45] Date of Patent: Jan. 12, 1993

[54] SYSTEM INHIBITING MESSAGE DELIVERY TO DESTINATION PROCESS UNTIL PRIORITY OF PROCESS EXECUTING ON DESTINATION PROCESSOR IS NO HIGHER THAN PRIORITY OF SENDING PROCESS

[75] Inventors: Olov G. Gyllstrom, Hudson, Mass.; Magnus S. Karlsson, Denver, Colo.

[73] Assignee: AT&T Bell Laboratories, Murray Hill, N.J.

[21] Appl. No.: 334,836

[22] Filed: Apr. 7, 1989

[51] Int. Cl.⁵ .............................................. G06F 9/46
[52] U.S. Cl. ................................. 395/725; 364/281.3; 364/284.3; 364/281.7; 364/242.6; 364/DIG. 1; 395/650
[58] Field of Search ... 364/200 MS File, 900 MS File; 395/725, 650

[56] References Cited

U.S. PATENT DOCUMENTS

| | | | |
|---|---|---|---|
| 4,333,144 | 6/1982 | Whiteside | 364/200 |
| 4,369,494 | 1/1983 | Bienvenu | 364/200 |
| 4,414,624 | 11/1983 | Summer | 364/200 |
| 4,435,780 | 3/1984 | Herrington | 364/900 |
| 4,517,561 | 5/1985 | Burke | 370/85.6 |
| 4,581,734 | 4/1986 | Olson | 370/94.1 |
| 4,663,708 | 5/1987 | Taub | 364/200 |
| 4,663,757 | 5/1987 | Huang | 370/94.1 |
| 4,725,946 | 2/1988 | Prange | 364/200 |
| 4,733,347 | 3/1988 | Fukuoka | 364/200 |
| 4,740,965 | 4/1988 | Fairbairn | 370/110.1 |
| 4,771,391 | 9/1988 | Blasbalg | 364/200 |
| 4,771,422 | 9/1988 | Hauer | 370/85.6 |
| 4,823,304 | 4/1989 | Frantz | 364/900 |
| 4,825,354 | 4/1989 | Agrawal | 364/200 |
| 4,928,222 | 5/1990 | Vriezen | 364/200 |
| 4,933,936 | 6/1990 | Rasmussen | 340/825.5 |
| 4,949,254 | 8/1990 | Shorter | 364/200 |
| 4,980,824 | 12/1990 | Tulpale | 364/200 |
| 4,985,831 | 1/1991 | Dulong | 364/200 |
| 4,989,133 | 1/1991 | May | 364/200 |

*Primary Examiner*—Thomas C. Lee
*Assistant Examiner*—Eric Coleman
*Attorney, Agent, or Firm*—David Volejnicek

[57] ABSTRACT

To ensure delivery of inter-process messages at the same priority level at which they were sent in a multiprocessor (20), each message (200) includes a field (201) that indicates the priority of the sending process. When a message is received on a processor, a message-delivery function (22) determines whether the priority indicated by the message's field is lower than the priority of a process presently running on the processor. If not, the message is immediately delivered to the destination process; if so, the message is stored in the one queue of a plurality of queues (301-303) on the processor that corresponds to priority indicated by the message's field. Upon change of running process on the processor, the message-delivery function causes delivery to destination processes of messages stored in queues of the processor that correspond to priorities at least as high as the priority of the about-to-be-run process.

10 Claims, 3 Drawing Sheets

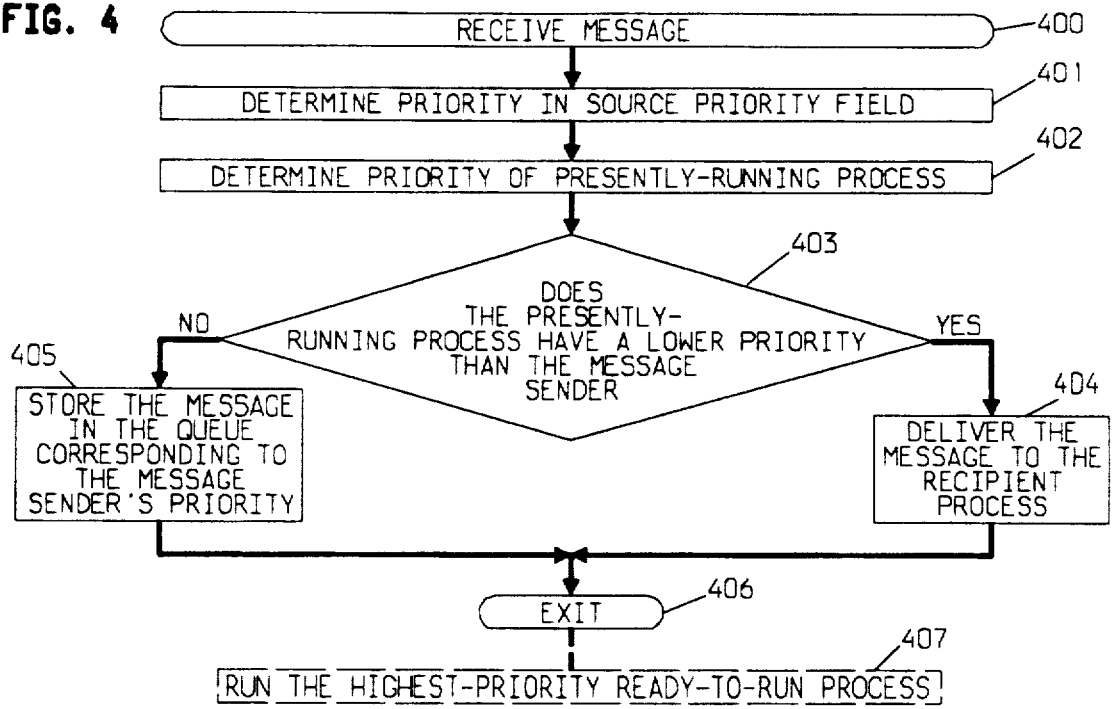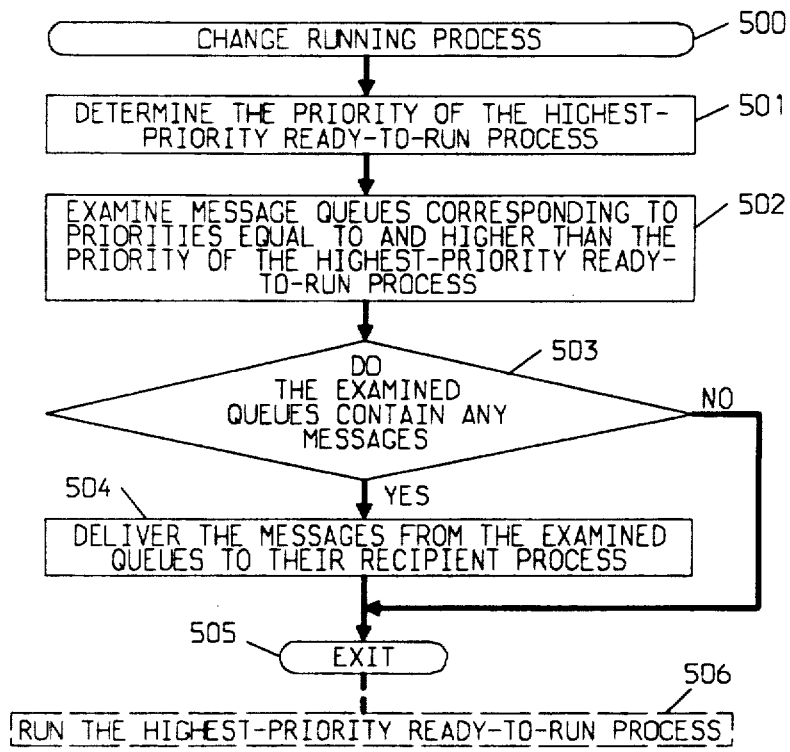

SYSTEM INHIBITING MESSAGE DELIVERY TO DESTINATION PROCESS UNTIL PRIORITY OF PROCESS EXECUTING ON DESTINATION PROCESSOR IS NO HIGHER THAN PRIORITY OF SENDING PROCESS

This invention relates to multiprocessor systems, and particularly to inter-process communications in such systems.

BACKGROUND OF THE INVENTION

In a processing system, every process typically has an associated priority that specifies its importance relative to other processes. Processes that are ready to execute are executed in their order of priority. When executing, a process may send messages to and receive messages from other processes. Receipt of a message by one process from another process often makes the receiving process ready to execute. If the ready-to-execute receiving process is of a higher priority than the presently-executing process, in a real-time system, the presently-executing process is immediately preempted and the receiving process commences execution; in a time-sharing system, the presently-executing process continues to execute until it either becomes blocked or its execution-time slice expires, at which time the highest-priority ready-to-run process commences execution.

In a uniprocessor system, the fact that the message-sending process is executing means that no higher-priority processes are ready to execute, in a real-time system, or were ready to execute at the start of the present time slice, in a time-sharing system. Hence, the message-sending process does not preempt or postpone execution of any higher-priority processes by sending a message that may trigger execution of the message-receiving process.

In a multiprocessor system, a plurality of process may be executing simultaneously, thereby complicating the scenario of a uniprocessor system. Distributed operating systems are intended to create an environment in a multiprocessor system that appears to system users to be the same as a uniprocessor system. However, in a multi-processor system, processes on each processor execute in the order of their priority, and a hence message from an executing process on one processor to a process on another processor may preempt or postpone execution on the other processor of ready-to-execute processes having a higher priority than the sending process, if the receiving process has an even-higher priority. This is clearly inconsistent with uniprocessor process priority handling, and violates the goal of making the distributed operating system environment appear as a uniprocessor system.

SUMMARY OF THE INVENTION

The invention is directed to solving this and other problems of the prior art. According to the invention, delivery of a message to its destination process is inhibited until the priority of the process then executing on the destination processor is no higher than the priority of the sending process. Illustratively, a message that is received on a processor is stored and is not delivered to the destination process until the process that is presently executing on the receiving processor has a priority no higher than the priority of the sending process. This guarantees that messages—e.g., messages sent from other processors of a multiprocessor system—are delivered at the same priority as they were sent, and hence do not cause preemption of higher-priority processes. As a consequence, the user operating environment of a uniprocessor system is preserved in the multi-processor system. Advantageously, to facilitate determination of message-sending process priority on message-receiving processors, inter-process messages include indications of the priority of the sending process.

This and other advantages and features of the invention will become more apparent from the following description of an illustrative embodiment of the invention considered together with the drawing.

BRIEF DESCRIPTION OF THE DRAWING

FIGS.4 and 5 are a flow diagram of the operation of a message-delivery function of FIG. 1.

DESCRIPTION OF A PREFERRED EMBODIMENT

Figure 1:
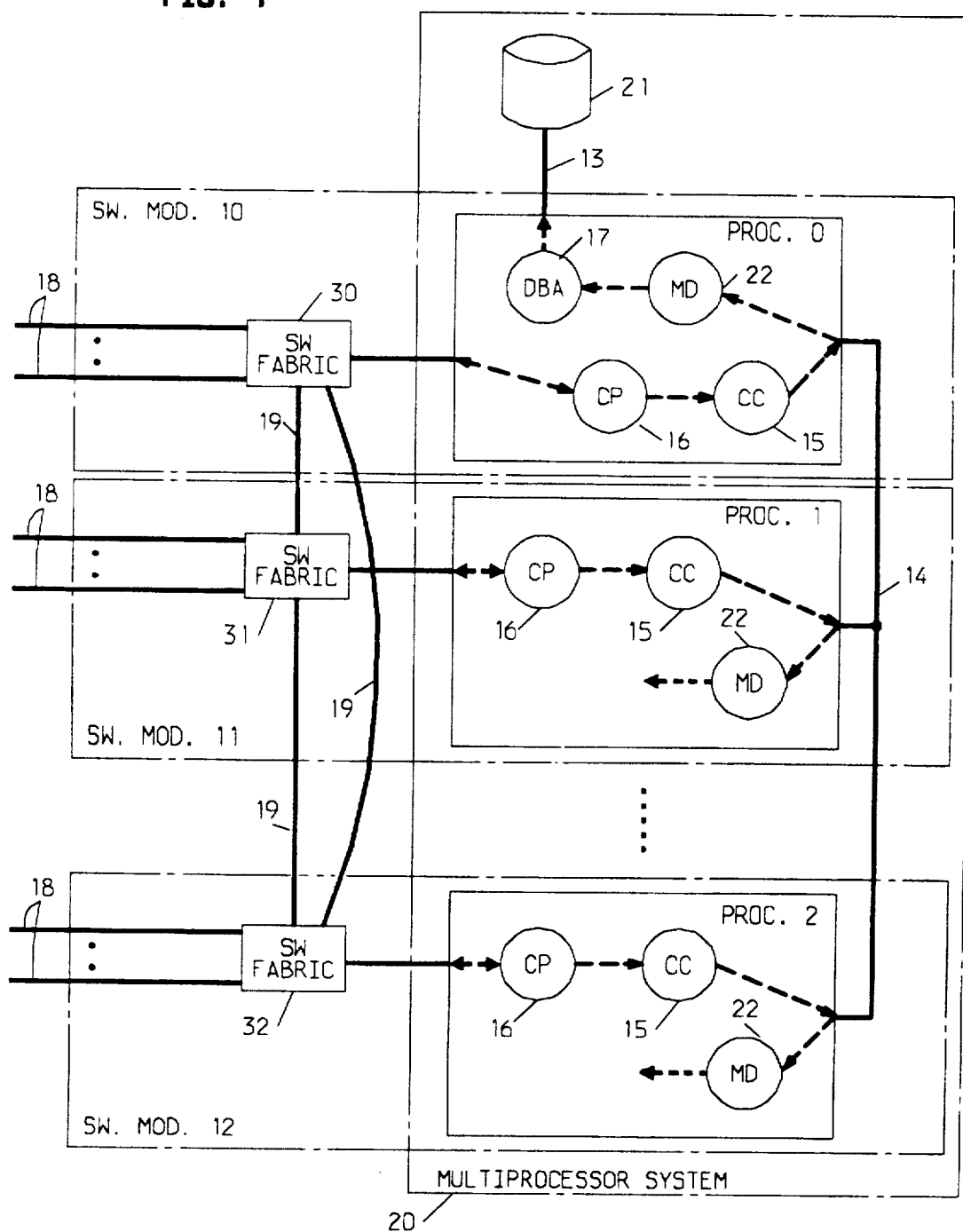
FIG. 1 is a block diagram of a system that includes an illustrative embodiment of the invention.

FIG. 1 shows a telephony switching system, such as a private branch exchange (PBX). The switching system is made up of a plurality of switching modules 10-12 each one of which has connections via links and trunks 18 to terminal equipment of a different group of subscribers and serves those subscribers' telecommunication needs. Switching modules 10-12 include communication switching fabrics 30-32 and processors 0-2 for controlling the fabrics to provide communication services. Fabrics 30-32 are interconnected by communication links 19 comparable to links 18, and processors 0-2 are interconnected by a communication link 14—such as a bus—to form a multiprocessor system 20. Alternatively, link 14 may be eliminated and processors 0-2 may be interconnected by switched or nailed-up paths through switching fabrics 30-32 and links 19. Also forming a part of system 20 is a disk-based database 21 which is connected to one of the processor—processor 0—by a communication link 13.

Each processor 0-2 includes a call-processing (CP) process 16 for servicing (e.g., establishing and terminating paths for) communications through its connected switching fabrics 30-32. Additionally, processor 0 includes a database administration (DBA) process 17 for controlling database 21. Through process 17, processor 0 provides database service for all processors of the multiprocessor system 20. For example, database 21 stores detailed records of calls serviced by call-processing processes 16 executing in each processor 0-2. Processes 16 communicate with database administration process 17 through a communication (CC) process 15. An instance of process 15 is included in each one of processors 0-2.

Each process 15-17 has a priority assigned thereto within the processor 0-2 on which it resides. Processes 15 have a low priority, processes 16 have a medium priority, and process 17 has a high priority. High priority processes (not shown) may also exist in processors 1 and 2 and messages may be sent thereto from other processors.

Multiprocessor system 20 is a real-time system. In each processor 0-2, a particular process is either in a READY (to run, i.e., to execute) state, a RUN state, or a BLOCKED state. Only one process may be in the RUN state, being executed or running in each processor at any time. When the presently-running process becomes BLOCKED, the highest-priority READY process assumes the RUN state and is executed. When a process of a higher priority than the presently-running process becomes ready to run, it preempts the running process, i.e., causes the running process to leave the RUN state and assume the READY state. Hence, the running process is always the highest-priority process that is ready to be executed.

When call-processing process 16 of processor 0 runs, it means that the higher-priority database administration process 17 is blocked, for example, because it has no work to do. When running process 16 of processor 0 generates information about a call that it wishes to save in database 21, it communicates the information by sending a message to process 15 of processor 0. Receipt of the information and substitute message may place process 15 of processor 0 in the READY state, but because it is of a lower priority than process 16, it cannot preempt process 16 and hence must wait until process 16 of processor 0 is done running before it can assume the RUN state.

When process 15 of processor 0 assumes the RUN state, it communicates the information that it received from process 16 of processor 0 to process 17 by means of a message. Receipt of the message may place process 17 in the READY state; if so, process 17 preempts process 15 on account of its higher priority, and begins to run. Running process 17 stores the information that it received in the message in database 21.

A running process 16 of processor 1 or 2 may likewise generate information about a call that it wishes to save in database 21, and so communicates the information to process 15 of its own processor. This process 15, too, cannot assume the RUN state until its processor's process 16 is done running. And when process 15 of processor 1 or 2 runs, it communicates the received information by means of messages over link 14 to process 17 of processor 0.

As was state above, receipt of a message may place process 17 in the READY state and—since process 17 is the highest-priority process on processor 0—cause preemption of any other running process on processor 0 and execution of process 17. It can thus be seen that a low-priority process (process 15) of processor 1 or 2 can preempt a higher-priority process (process 16) of processor 0, merely by sending a message to the highest-priority process 17. But this is inconsistent with what may be accomplished by process 15 of processor 0, and hence is undesirable. Similar inconsistencies may occur on processor 1 or 2 caused by inder-processor messages received thereon.

Figure 2:
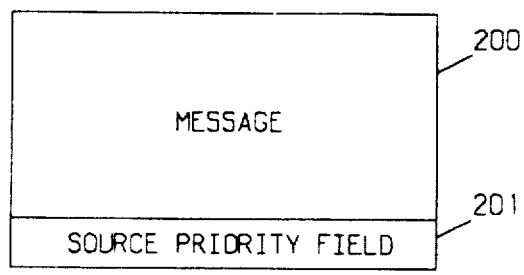
FIG. 2 is a block diagram of an inter-process message of the processes of FIG. 1.

The above-described undesirable effect is eliminated in accordance with the invention. As shown in FIG. 2, each inter-process message 200 is expanded to include a source priority field 201 wherein is indicated the priority of the process that sent the message. Thus, messages sent by processes 15—the messages sent by processes 15 to process 17, for example—would have an indication of low priority in field 201; messages sent by process 16—the information about calls sent to processes 15, for example—would have an indication of medium priority in field 201; and any messages sent by process 17 would have an indication of high priority in field 201.

Figure 3:
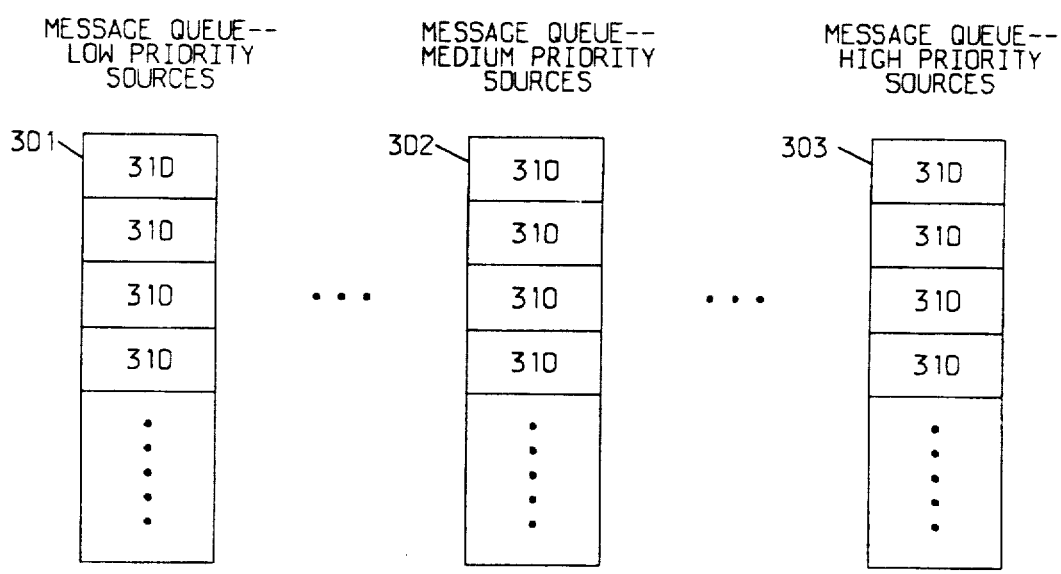
FIG. 3 is a block diagram of message queues of a processor of FIG. 1.

In each processor which is a possible recipient of a message 201—illustratively in each processor 0-2—there are established a plurality of message queues 301-303, one for each source process priority level, as shown in FIG. 3. Each queue 301-303 comprises a plurality of entries 310 each for storing a message 200 having the queue's corresponding priority indicated in its field 201. When a message 200 is received in a processor from any source (i.e., irrespective of whether the message is an inter-processor message or merely an inter-process intra-processor message), it is not unconditionally immediately delivered to the process that is its intended recipient; rather, the message may temporarily be stored in one of the queues 301-303 prior to its delivery. Control of delivery of received incoming messages, and control over queues 301-303, is exercised by a message-delivery (MD) function 22, a copy of which exists in each processor that has queues 301-303. Function 22 is invoked on a recipient processor via an interrupt; i.e., function 22 runs at a priority higher than any process 15-17. The operation of function 22 is charted in FIGS. 4 and 5.

In response to receipt of a message 200 on a processor 0-2, at step 400 of FIG. 4, function 22 of the recipient processor is invoked and determines the priority of the sending process from the message's source priority field 201, at step 401. Function 22 also determines the priority of the process presently running on the recipient processor, i.e., determines the priority of the process whose execution it interrupted, at step 402. Function 22 then compares the two priorities to determine whether the priority of the presently-running process is lower than the priority of the process that sent the received message 200, at step 403. If the presently-running process has a lower priority than the message sender process, function 22 causes the received message 200 to be immediately delivered directly to the intended recipient process, at step 404, and exits, at step 406. However, if the presently-running process does not have a lower priority than the message sender process, function 22 stores the received message 200 in an entry 310 of the one of the queues 301-303 that corresponds to the priority of the message sender process, at step 405, and then exits, at step 406.

Exit of function 22 marks return to execution of the interrupted process in function 22 performed step 405, as suggested at step 407. (Step 407 is not performed by function 22, but by other well-known components of the processor, e.g., a scheduler; it is therefore distinguished from steps 400-406 by being shown in dashed lines). However, if function 22 performed step 404, its exit may mark either the resumption of execution of the interrupted process or commencement of execution of another process, depending on whether or not delivery of the received message resulted in a process having a higher priority than the interrupted process being placed in the READY state, also as suggested by step 407.

In response to a change in the process which is the running process, at step 500 of FIG. 5, function 22 is again invoked and determines the priority of the highest-priority process in the READY state, i.e., determines the priority of the process which is about to be run, at step 501. Function 22 then examines entries 310 of those queues 301-303 that correspond to priorities higher than and equal to the priority of the process which is about to be run, at step 502, to determine whether any entries 310 of the examined queues contain undelivered messages 200, at step 503. If any of the examined queues do contain undelivered messages 200, function 22 delivers them to their recipient process, at step 504, and clears them from the queues. Function 22 then exits, at step 505. If there are no undelivered messages 200 in the examined queues, function 22 merely exits at step 505.

Exit of function 22 marks commencement of execution of the process which was about to be run at step 501 if function 22 took the "NO" path from step 503, as suggested at step 506. (Step 506, like step 407, is not performed by function 22 and hence is shown in dashed lines.) However, if function 22 performed step 504, its exit may mark either the execution of the process which was about to be run at step 501 or of another process, depending on whether or not delivery of any of the messages from queues 301-303 resulted in a process having a higher priority than the process which was about to be run at step 501 being placed in the READY state, also as suggested by step 506.

From the foregoing, it may be seen that all inter-process messages in the multiprocessor system are delivered at the same priority as the one at which they are sent, i.e., at the priority of the sender process. Hence, a lower-priority (sending) process never causes preemption of a higher-priority process by sending a message to a yet-higher priority process. Consequently, a uniprocessor operating environment is preserved in the multiprocessor.

Of course, it should be understood that various changes and modifications to the illustrative embodiment described above will be apparent to those skilled in the art. Under one variant of the embodiment, a plurality of priorities may be associated with each message. For example, different priorities may be assigned to the individual processors of the multiprocessor system, and each inter-processor message may include a second—processor—priority field indicative of the priority of its source processor. Messages then may be delivered to their recipients on the basis of—in the order of—both of the indicated priorities. Alternatively, the two priorities and message priority fields may be combined into a single, weighted, priority indicative of both the source process' and source processor's priorities. Also, the multiprocessor system may be a time-sharing, as opposed to a real-time, system. Such changes and modifications can be made without departing from the spirit and the scope of the invention and without diminishing its attendant advantages. It is therefore intended that all such changes and modifications be covered by the following claims.

We claim:

1. An arrangement comprising:
   means for determining priority of individual processes in a multiprocessor in which each one of a plurality of processors supports process having respective priorities which determine the order in which the process execute;
   means for sending a message from a sending process on a sending one of the processors to a destination process on a different destination one of the processors;
   means cooperative with the determining means for inhibiting the delivery of said message sent by said sending process to said destination process until the priority of the process then executing on the destination processor is no higher than the priority of the sending process, and for enabling delivery of the message to the destination process when the priority of the process then executing on the destination processor is no higher than the priority of the sending process.

2. An arrangement comprising:
   means for determining priority of a sending process on a sending one of a plurality of processors of a multiprocessor in which each processor supports processes having respective priorities which determine the order in which the processes execute;
   means for sending a message from said sending process on said sending one of the processors to a destination process on a different destination one of the processors;
   means for determining priority of a process presently executing on said destination one of the processors;
   means for effecting storage of a message from the sending process for said destination process on the destination processor until the priority of the process presently executing on the destination processor is no higher than the priority of the sending process; and
   means for effecting delivery of the message to the destination process when the priority of the process presently executing on the destination processor is no higher than the priority of the sending process.

3. An arrangement for use with a plurality of runnable processes that send messages to each other, and means for sending a message from a sending process on a sending one of the processors to a destination process on a different destination one of the processors, each process having a priority selected from a plurality of different priorities, the arrangement comprising;
   a plurality of storage means each corresponding to a different priority of the plurality of priorities, for storing messages;
   first means for running a selected process; and
   second means responsive to a message sent by a sending process on a sending one of a plurality of processors to a destination process on a different destination one of the plurality of processors, for effecting delivery of the message to the destination process if the priority of the sending process is greater than the priority of a process which is presently selected to run on the destination processor, and for storing the message in one of the storage means corresponding to the priority of the sending process if the priority of the sending process is lower than the priority of the process which is presently selected to run on the destination processor,
   the second means further responsive to a change of process which is presently selected to run on the destination processor from one process to another process, for effecting delivery to destination process on the destination processor of messages stored in storage means corresponding to priorities at least as high as the priority of the other process.

4. The arrangement of claim 3 wherein:
   each message includes an indicator indicating the priority of the process which sent the message;
   each storage means is for storing messages whose indicators indicate the priority to which the storage means corresponds; and
   the second means responds to a sent message by comparing the priority indicated by the message's indicator with the priority of the process which is presently selected to run to determine whether to store or to effect delivery of the sent message.

5. A multiprocessor comprising:

a plurality of processors for running a plurality of processes, the processes for sending messages to each other, each process having a priority selected from a plurality of different priorities;

each processor including means for establishing a plurality of queues each corresponding to a different priority of the plurality of priorities, and means responsive to receipt on its processor of a message sent by a sending process on a different one of the processors to a destination process on its processor, for effecting delivery of the received message to the destination process if the priority of the sending process is greater than the priority of a process which is presently selected to run on its processor, and for storing the message in the one of the queues on its processor that corresponds to the priority of the sending process if the priority of the sending process is greater than the priority of the process which is presently selected to run to its processor, the means further responsive to a change of process which is presently selected to run on its processor from one process to another process, for effecting delivery to destination processes on its processor of messages stored in queues on its processor that correspond to priorities at least as high as the priority of the other process;

thereby to effect delivery on each processor of messages at the same priorities at which they were sent.

6. A computer-implemented method comprising the computer-implemented steps of sending a message from a sending process on a sending one of a plurality of processors to a destination process on a different destination one of the processors;

inhibiting the delivery of the message sent by said sending process to said destination process until the priority of the process then executing on the destination processor is no higher than the priority of the sending process; and enabling delivery of the message to the destination process when the priority of the process then executing on the destination processor is no higher than the priority of the sending process.

7. The method of claim 6 wherein the step of inhibiting includes the steps of:

determining the priority of the sending process;

determining the priority of the process presently executing on the destination processor;

effecting storage of the message until the priority of the process presently executing on the destination processor is no higher than the priority of the sending process; and effecting delivery of the message to the destination process when the priority of the process presently executing on the destination processor is no higher than the priority of the sending process.

8. A computer-implemented method of delivering messages among a plurality of processes that send messages to each other, each process having a priority selected from a plurality of different priorities, the method comprising the computer-implemented steps of:

determining relative priorities of a process on a sending one of a plurality of processors that sent a message and a process which is presently selected to run on a different destination one of the processors, in response to receipt of the message;

effecting delivery of the sent message to its destination process on the destination processor if the priority of the sending process is determined to be greater than the priority of the presently-selected process;

storing the sent message in a storage corresponding to the priority of the sending process if the priority of the sending process is determined to be lower than the priority of the presently-selected process;

determining the priority of another process, in response to change of process which is presently selected to run on the destination processor from one process to the other process; and effecting delivery to destination processes on the destination processor of messages stored in storage corresponding to priorities at least as high as the determined priority of the other process.

9. The method of claim 8 wherein:

each message includes an indicator indicating the priority of the process which sent the message;

the step of determining relative priorities comprises the step of comparing the priority indicated by the indicator of the sent message with the priority of the presently-selected process; and the step of storing comprises the step of storing the sent message in a storage corresponding to the priority indicated by the indicator of the sent message.

10. A multiprocessor comprising:

a plurality of processors, each processor supporting processes having respective priorities which determine the order in which the processes execute;

means cooperative with the processors for enabling a sending process on a sending one of the processors to deliver a message to a destination process on a different destination one of the processors; and means cooperative with the processors for inhibiting delivery of the message to the destination process until the priority of the process then executing on the destination processor is no higher than the priority of the sending process, and for enabling delivery of the message to the destination process when the priority of the process then executing on the destination processor is no higher than the priority of the sending process.

* * * * *